United States Patent [19]
Ostrozynski

[11] 3,843,703
[45] Oct. 22, 1974

[54] PROCESS FOR PREPARING SILICON PEROXIDE COMPOUNDS

[75] Inventor: Robert Leopold Ostrozynski, Mahopac, N.Y.

[73] Assignee: Union Carbide Corporation, New York, N.Y.

[22] Filed: Sept. 7, 1971

[21] Appl. No.: 178,452

[52] U.S. Cl. .................. 260/448.2 E, 260/448.2 N
[51] Int. Cl. .............................................. C07l 7/08
[58] Field of Search .......................... 260/448.2 E

[56] References Cited
UNITED STATES PATENTS
3,478,074  11/1969  Omietanski et al. ......... 260/448.2 E

OTHER PUBLICATIONS

Buncel et al., "Chem. and Ind.," p. 1052, 10/6/56.

Primary Examiner—Daniel E. Wyman
Assistant Examiner—P. F. Shaver
Attorney, Agent, or Firm—Reynold J. Finnegan

[57] ABSTRACT

A process for preparing a silicon peroxide compound comprising reacting a silazane compound with a hydroperoxide compound.

12 Claims, No Drawings

PROCESS FOR PREPARING SILICON PEROXIDE COMPOUNDS

BACKGROUND OF THE INVENTION

This invention relates to a method for preparing silicon peroxide compounds in which the peroxide oxygen atom is directly bonded to a silicon atom. More particularly, this invention relates to a method for preparing silane peroxides by reacting a silicon-nitrogen compound with a peroxide compound.

Heretofore, silane peroxide compounds have generally been prepared by the classical manner involving the reaction of a halogen-silicon compound with a peroxide compound in the presence of an amine base. However, this method suffers from a number of disadvantages. For instance, the reaction is very difficult to carry out cleanly due to the production of an undesirable amine hydrohalide by-product which forms a particulate bulky precipitate that thickens the reaction mass, obstructs filtration and occludes much of the desired product, thereby allowing for only small yields of silicon-peroxy product.

It has also been suggested that peroxy silanes can be prepared by reacting a hydroaminesilane with a peroxide as shown by Pike and Shaffer, "Chemical Abstracts," Vol. 52, page 4,471 g (1958) and illustrated by the following equation:

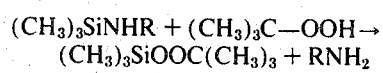

$(CH_3)_3SiNHR + (CH_3)_3C—OOH \rightarrow (CH_3)_3SiOOC(CH_3)_3 + RNH_2$ wherein R presumably represents a hydrocarbon radical. However, this process too is reported to give very low yields of the desired silicon peroxide product.

More recently it has been found that silane peroxy compounds can be produced in high yields by the reaction of a dimethylaminosilane and a hydroperoxide as described more fully in my concurrently filed U.S. application Ser. No. 178,453, entitled "Process For Preparing Silicon Peroxide Compounds," now U.S. Pat. No. 3,700,712.

SUMMARY OF THE INVENTION

It has now been discovered that high yields of silane peroxide compounds can also be produced by the instant invention which comprises reacting a silazane compound with a peroxide compound.

Therefore, it is an object of this invention to provide an efficient and economical process for producing high yields of silane peroxide compounds. Other objects and advantages of this invention will become readily apparent from the following description and appended claims.

More specifically the general reaction of the instant invention involves the reaction of a silazane with a hydroperoxide to form monofunctional silane peroxy compounds, i.e., a silane having only one peroxy group (—OOR) directly bonded to the silicon atom, and/or difunctional silane peroxy compounds, i.e., a silane having two peroxy groups (—OOR) directly bonded to the silicon atom.

DESCRIPTION OF THE PREFERRED EMBODIMENTS

The silazane starting materials that can be employed in the process of this invention included (1) linear silazanes having the formula

$R_3Si$—$(NHSiR_2)_x$—$NHSiR_3$ wherein each R is individually selected from the group consisting of hydrogen and a monovalent substituted or unsubstituted hydrocarbon radical having from one to 20 carbon atoms, and wherein x has a value of from 0 to 100 inclusive; and cyclic silazanes having the formula

$(R_2SiNH)_n$ wherein each R is the same as defined above and n is an integer of from 3 to 5 inclusive. Such silazanes as well as methods for their preparation are well known in the art.

As noted above R may be any monovalent hydrocarbon radical. Among the more specific radicals that may be mentioned are, for example, alkyl radicals, such as methyl, ethyl, propyl, butyl, isobutyl, amyl, hexyl, octadecyl and the like; alkenyl radicals such as vinyl, allyl, butenyl, cyclopentenyl, cyclohexenyl and the like; alicyclic radicals, such as cyclopentyl, cyclohexyl and the like; aryl radicals, such as phenyl, naphthyl, and the like; aralkyl radicals such as benzyl, phenethyl and the like; and alkaryl radicals such as tolyl, xylyl, mesityl and the like. Moreover, any substituent which does not effect the essential performance of the instant process may be present on said hydrocarbon radicals.

When linear silazanes are employed as the starting material of the instant process monofunctional and difunctional silane peroxy compounds can be generated. For instance, when hexamethyldisilazane is employed 2 moles of trimethylsilane peroxy compound can be formed, when octamethyltrisilazane is employed 2 moles of trimethylsilane peroxy compound and 1 mole of dimethylsilane diperoxy compound can be formed, when decamethyltetrasilazane is employed 2 moles of trimethylsilane peroxy and 2 moles of dimethylsilane diperoxy compound can be formed and when dodecamethylpentasilazane is employed 2 moles of trimethylsilane peroxy compound and 3 moles of dimethylsilane diperoxy compound can be formed. These processes may be illustrated by the following equations wherein Me represents a methyl radical and R represents the remainder of the organic hydroperoxide compound.

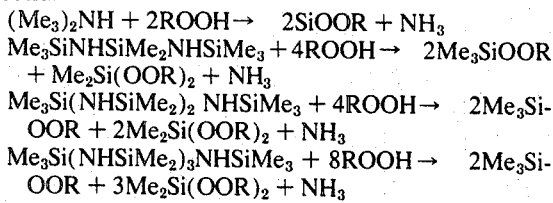

$(Me_3)_2NH + 2ROOH \rightarrow 2SiOOR + NH_3$ $Me_3SiNHSiMe_2NHSiMe_3 + 4ROOH \rightarrow 2Me_3SiOOR + Me_2Si(OOR)_2 + NH_3$ $Me_3Si(NHSiMe_2)_2NHSiMe_3 + 4ROOH \rightarrow 2Me_3SiOOR + 2Me_2Si(OOR)_2 + NH_3$ $Me_3Si(NHSiMe_2)_3NHSiMe_3 + 8ROOH \rightarrow 2Me_3SiOOR + 3Me_2Si(OOR)_2 + NH_3$ From the above equations it becomes readily apparent that when linear silazanes are employed 2 moles of monofunctional silane peroxy compound are always formed while the number of moles of difunctional silane peroxy compound formed is a function of the number of nitrogen atoms in the silazane, that is to say, the number of moles of difunctional silane peroxy compound formed will be equal to X minus one wherein X is the number of nitrogen atoms in the linear silazane. It is also apparent from said equations that the number of moles of organic hydroperoxide compound employed is also a function of the number of nitrogen atoms in the silazane, that is to say, the number of moles of hydroperoxide used will be equal to X multiplied by two wherein X is the number of nitrogen atoms in the linear silazane.

Among the more preferred linear silazanes are those having the formula $$R_3Si(NHSiR_2)_x NHSiR_3$$

wherein each R is individually a member selected from the class consisting of hydrogen, methyl, ethyl, vinyl and phenyl radicals, especially methyl, and wherein $x$ has a value of 0 to 5 inclusive, especially 0.

When cyclic silazanes are employed as the starting material of the instant process difunctional silane peroxy compounds are generated as illustrated by the following equations wherein Me represents a methyl radical and R represents the remainder of the organic hydroperoxide compound.

$$(Me_2SiNH)_3 + 6ROOH \rightarrow 3Me_2Si(OOR)_2 + 3NH_3$$

$$(Me_2SiNH)_4 + 8ROOH \rightarrow 4Me_2Si(OOR)_2 + 4NH_3$$

$$(Me_2SiNH)_5 + 10ROOH \rightarrow 5Me_2Si(OOR)_2 + 5NH_3$$

From these above equations it becomes readily apparent that when cyclic silazanes are employed the number of moles of difunctional silane peroxy compound formed is a function of the number of nitrogen atoms in the silazane and is equal to said number of nitrogen atoms, while the number of moles of organic hydroperoxide compound employed is also a function of the number of nitrogen atoms in the silazane and is equal to X multiplied by two wherein X is the number of said nitrogen atoms in the cyclic silazane.

Among the more preferred cyclic silazanes are those having the formula $$(R_2SiNH)_n$$

wherein each R is individually a member selected from the class consisting of hydrogen, methyl, ethyl, vinyl and phenyl radicals, especially methyl and wherein $n$ is an integer of from 3 to 5 inclusive, especially 3.

Specific examples of such silazanes include for example,
Me$_3$SiNHSiMe$_3$;
Et$_3$SiNHSiEt$_3$;
Me$_2$EtSiNHSiMe$_2$Et;
Me$_2$ViSiNHSiMe$_2$Vi;
Me$_2$$\phi$SiNHSiMe$_2$ $\phi$;
Me$_3$SiNHSiMe$_2$NHSiMe$_3$;
Me$_3$Si(NHSiMe$_2$)$_2$ NHSiMe$_3$;
Me$_3$Si(NHSiMe$_2$)$_4$ NHSiMe$_3$;
Me$_3$Si(NHSiMe$_2$)$_{100}$NHSiMe$_3$;
Me$_3$Si(NHSiMe$_2$)$_3$ NHSiEt$_2$NHSiMe$_3$;
Et$_3$SiNHSiEt$_2$NHSi Et$_3$;
Me$_3$Si(NHSiMe$_2$)$_3$NHSiMeViNHSiMe$_3$;
Me$_3$Si(NHSiMe$_2$)$_3$ NHSi$\phi_2$NHSiMe$_3$;
(Me$_2$SiNH)$_3$;
(Me$_2$SiNH)$_4$;
(Me$_2$SiNH)$_5$;
(Et$_2$SiNH)$_3$;
(Me$_2$SiNH)$_2$(Et$_2$SiNH)$_2$;
(Me$_2$SiNH)$_3$(Me$\phi$SiNH);
(Me$_2$SiNH)$_2$(MeViSiNH);
($\phi_2$SiNH)$_3$;
and the like wherein Me represents a methyl radical (—CH$_3$), Et represents an ethyl radical (—C$_2$H$_5$), Vi represents a vinyl radical (—CH=CH$_2$), and $\phi$ represents a phenyl radical (—C$_6$H$_5$).

Any organic hydroperoxide compound containing a peroxy group (—OOH) may be employed in the practice of this invention. Illustrative of such hydroperoxides are: hydrogen peroxide; methyl hydroperoxide; ethyl hydroperoxide; propyl hydroperoxide; isopropyl hydroperoxide; n-butyl hydroperoxide; sec-butyl hydroperoxide t-butyl hydroperoxide; t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide; trans-decalin hydroperoxide (trans-decahydro-4-$\alpha$napthyl hydroperoxide); hexahydro-3$\alpha$-indanyl hydroperoxide; 2-hydroperoxy-2,4-dimethyl-3-pentanone; 2-cyclopenten-1-yl hydroperoxide; 2-cyclohexen-1-yl hydroperoxide; 2-methyl-2-cyclohexen-1-yl hydroperoxide; 2,3-dimethyl-2-cyclohexen-1-yl hydroperoxide; d,1-3-p-menthenyl-8-hydroperoxide; 3-methyl-3-hydroperoxy-1-butyne(1,1-dimethyl-2-propynyl hydroperoxide); $\alpha$-methylbenzyl hydroperoxide; $\alpha,\alpha$-dimethylbenzyl hydroperoxide; $\alpha$-methyl $\alpha$-$\alpha$ethyl-benzyl hydroperoxide; $\alpha$-p-xylyl hydroperoxide; diphenylmethyl hydroperoxide; triphenylmethyl hydroperoxide; tetralin hydroperoxide-(1,2,3,4-tetrahydro-1-naphthyl hydroperoxide); 1,2,3,4-tetrahydro-1-methyl-1-naphthyl hydroperoxide; 9-fluorenyl hydroperoxide; 1-indanyl hydroperoxide; tetrahydro-2-furyl hydroperoxide; tetrahydroarbazole hydroperoxide (1,2,3,4-tetrahydro-4$\alpha$H-isocarbazol-4$\alpha$-yl hydroperoxide), and 2,3-dimethyl-3-hydroperoxy butene-1.

The preferred hydroperoxides employable in the practice of this invention are those encompassed by the formula R'(OOH) wherein R' represents a hydrocarbon radical having from one to 30 carbon atoms, such as alkyl, aryl, aralkyl, cycloalkyl, arylcycloalkyl and the like.

The manner and order in which the reaction components are mixed is not critical. In general the organic hydroperoxide is placed in a suitable reaction vessel and the silazane compound is added, preferably with moderate agitation and the reaction mass heated to its desired temperature. During the reaction the temperature may rise as a result of the spontaneous generation of heat from the reaction. If the heat rise is substantially higher than desired it can be controlled by cooling the reaction mass. Solvents, while not necessary, can be used if desired for the purpose of dehydrating the organic hydroperoxide before its reaction with the silazane compound. This may be done by heating the mixture of organic hydroperoxide and any conventional solvent to boiling and removing the water as a binary azeotrope prior to addition of the silicon-nitrogen compound. Typical examples of such conventional solvents include hydrocarbons, halohydrocarbons, ether, tertiary amines and the like. Catalysts are not required by the instant invention, but may be used if desired to help accelerate sluggish reactions. Examples of such catalysts are those conventional catalysts used in known reactions of silicon-nitrogen compounds with hydroxy compounds such as organic acids, e.g., trifluoroacetic acid, $\beta$ —chloroproprionic acid and the like. Of course, it should be understood that while it is preferred to react a single silazane compound with a single organic hydroperoxide compound, various mixtures and combinations of such reactants can be employed if desired. Moreover, while it is preferred to employ the organic hydroperoxides without complexing aids, it should be understood that they can also be employed in the form of amine complex salts, such as the hydroperoxide adducts (e.g., t-butylhydroperoxide) of triethylene diamine, if desired, as described in U.S. Pat. No. 3,236,850.

The reaction temperature is not narrowly critical. The maximum temperature is, of course, limited by the decomposition temperature of the organic hydroperoxide or the boiling point of either one of the reactants. On the other hand the minimum temperature will be governed by the fusion point of either of the reactants. Generally the preferred temperature will range from about room temperature to about 100°C. with the most preferred temperature being from about 50° to 100°C. The reaction is preferably carried out at ambient pressure (about 1 atmosphere), however, it can be carried out under pressure, if desired. In view of the reactivity of the reactants towards water, alcohols and other hydroxylated substances, it is preferred that the reaction be carried out in an essentially anhydrous environment.

As pointed out above, the amount of reactants employed depends on the number of nitrogen atoms in the silazane starting material. For example, in theory two hydroperoxy groups (—OOH) are required to react with one silicon-nitrogen bond (Si—NH—Si) of the silazane. Accordingly the mole amount of hydroperoxy compound must contain at least twice the amount of hydroperoxide (—OOH) bonds in relation to the amount of silicon hydroamine (SiNHSi) in the silazane. Higher amounts of hydroperoxide compound can obviously be employed and in general it is peferred to employ the silazane in molar amounts that are slightly less 50 percent of the molar amount of hydroperoxide employed. By way of illustration at least 2 moles of a R'—OOH peroxide is required for every 1 mole of SiNHSi silazane employed to give 2 moles of a silicon peroxy (Si—OO—R') product wherein R' is the remainder of the organic hydroperoxide starting material.

The desired silicon peroxy product can be separated from the ammonia ($NH_3$) gas by-product by employing any conventional separation technique such as alembic vacuum distillation (stripping), sparging and the like after completion of the reaction which is easily determined by gas chromatography and/or infrared spectroscopy. The isolated silicon-peroxy product is subsequently analyzed for peroxy content by iodometric titration. Since the $NH_3$ gas is not very reactive towards the silicon peroxy products it need not be removed as soon as possible after completion of the reaction or vented off during the reaction, though it obviously may be if so desired.

Moreover, when mixtures of monofunctional and difunctional silicon peroxy compounds are obtained they may be separated if desired by conventional methods, such as distillation.

Thus the silicon peroxide products of this invention can be illustrated as those having the formula $$R_3Si\text{—}OOR'$$

and $$R_2Si(OOR')_2$$

wherein R and R' are the same as defined above.

The following examples are illustrative of the present invention and are not to be regarded as limitative. It is to be understood that all parts, percentages and proportions referred to herein and in the appended claims are by weight unless otherwise indicated. The symbol Me represents a methyl radical.

EXAMPLE 1

This example illustrates the formation of an SiOOC bond from a silazane, viz., SiNHSi, and an organic hydroperoxide.

A 50 ml., three-neck round bottom flask, fitted with a thermometer, a Friederich condenser and a 25 ml. addition funnel was charged with 9.0 grams (0.10 moles) of t-butyl hydroperoxide. 8.3 grams (0.05 moles) of hexamethyldisilazane, $(Me_3Si)_2NH$, was added dropwise to the reaction flask over a period of 30 minutes. On completing the addition, gas chromatography found the extent of reaction to be 78 percent. After about 3 hours, about 95 percent of the silazane was found to be converted to $Me_3SiOOC_4H_9$.

EXAMPLE 2

This example demonstrates the catalytic effect of a strong acid, such as trifluoroacetic acid, in the reaction of a silazane and an organic hydroperoxide.

A 25 ml., three-neck round bottom flask, fitted with a thermometer and a Friederich condenser was charged with 13.4 grams (0.12 moles) of t-butyl hydroperoxide and 4.9 grams (0.02 moles) of hexamethylcyclotrisilazane, $(Me_2SiNH)_3$. The progress of the reaction was followed by gas chromatography. The composition, expressed as the ratio of product ($Me_2Si(OOC_4H_9)_2$), to peroxide, ($C_4H_9OOH$) is tabulated as a function of reaction time below.

The experiment was repeated in the presence of 50 microliters of trifluoroacetic acid. The reaction progress is tabulated below.

| Reaction Time (minutes) | 70 | 310 | 1660 |
|---|---|---|---|
| Uncatalyzed Reaction | 0.32 | 1.2 | 5.0 |
| Trifluoroacetic Acid Catalyzed | 0.92 | 2.5 | 10.6 |

As reflected by the data, the acid catalyzed reaction proceeded approximately twice as fast as the uncatalyzed reaction.

EXAMPLE 3

This example demonstrates the inability of the by-product ammonia, to react with the $Me_2Si(OOC_4H_9)_2$ product so formed to produce an aminoxysilane, viz., $(C_4H_9O)Me_2SiONH_2$.

The reaction products produced in Example II were analyzed for active oxygen after 1,660 minutes of reaction. No attempt was made to remove the $NH_3$ by-product. After 2 weeks at ambient temperature, the products were again analyzed for active oxygen to determine if any decomposition of the silyl peroxide occurred. The results are tabulated below. The active oxygen is expressed as wt-% $C_4H_9COOH$.

| Time (Weeks) | 0 | 2 |
|---|---|---|
| Uncatalyzed Reaction | 57% | 58% |
| Trifluoroacetic Acid Catalyzed | 51% | 51% |

It is readily seen from the data, that no decomposition of the silane peroxide, Me$_2$Si(OOC$_4$H$_9$)$_2$, occurred over a 2 week period.

The silicon peroxide compounds of this invention are not novel and have found wide utility in the art as free radical initiators for the polymerization of vinyl monomers, e.g., styrene; as curing agents for silicon elastomers and organic plastics such as polyethylene and has coupling agents and bonding primers.

Various modifications and variations of this invention will be obvious to a worker skilled in the art and it is to be understood that such modifications and variations are to be included within the purview of this application and the spirit and scope of the appended claims.

What is claimed is:

1. A process for preparing silicon peroxide compounds which comprises reacting a silazane selected from the class consisting of linear silazanes having the formula

wherein R is hydrogen or a monovalent hydrocarbon radical and $x$ has a value of 0 to 100 and cyclic silazane having the formula

wherein R is the same as defined above and $n$ is an integer of from 3 to 5, with a hydroperoxide compound having the formula R'(OOH) wherein R' represents a hydrocarbon radical having from one to 30 carbon atoms.

2. A process as defined in claim 1 wherein it is catalyzed with an organic acid catalyst.

3. A process as defined in claim 1 wherein the silazane is a linear silazane having the formula

as defined therein.

4. A process as defined in claim 3 wherein R is methyl and $x$ has a value of from 0 to 5.

5. A process as defined in claim 4 wherein $x$ is 0.

6. A process as defined in claim 5, wherein the organic peroxide compound is tertiary butyl hydroperoxide.

7. A process as defined in claim 1, wherein the silazane is a cyclic silazane having the formula

as defined therein.

8. A process as defined in claim 7, wherein R is methyl.

9. A process as defined in claim 8 wherein $n$ is 3.

10. A process as defined in claim 9 wherein the hydrogen peroxide compound is tertiary butyl hydroperoxide.

11. A process as defined in claim 10 wherein it is catalyzed with an organic acid catalyst.

12. A process as defined in claim 11, wherein the catalyst is trifluoroacetic acid.

* * * * *